US006876674B1

United States Patent
Ruutu et al.

(10) Patent No.: US 6,876,674 B1
(45) Date of Patent: Apr. 5, 2005

(54) CLOCK GENERATING METHOD AND APPARATUS FOR AN ASYNCHRONOUS TRANSMISSION

(75) Inventors: Jussi Ruutu, Espoo (FI); Topi Kaaresoja, Helsinki (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 09/602,374

(22) Filed: Jun. 23, 2000

Related U.S. Application Data

(63) Continuation of application No. PCT/EP97/07264, filed on Dec. 23, 1997.

(51) Int. Cl.[7] .................................................. H04J 3/06
(52) U.S. Cl. ...................................................... 370/503
(58) Field of Search .............................. 370/310.1, 324, 370/350, 395.1, 395.62, 503, 509, 516, 518, 519, 310.2, 315, 328, 510, 512, 520; 455/456

(56) References Cited

U.S. PATENT DOCUMENTS

| | | | |
|---|---|---|---|
| 4,389,893 A | | 6/1983 | Ophir et al. |
| 4,414,850 A | | 11/1983 | Miwa et al. |
| 4,441,368 A | | 4/1984 | Flax |
| 4,452,082 A | | 6/1984 | Miwa |
| 4,621,645 A | | 11/1986 | Flax |
| 5,452,333 A | * | 9/1995 | Guo et al. .................. 375/371 |
| 5,724,243 A | * | 3/1998 | Westerlage et al. ......... 364/446 |
| 5,790,605 A | * | 8/1998 | Helm et al. ................. 375/347 |
| 5,812,618 A | * | 9/1998 | Muntz et al. ................ 375/372 |
| 5,822,383 A | * | 10/1998 | Muntz et al. ............... 375/362 |
| 5,834,980 A | * | 11/1998 | Pitio et al. ...................... 331/2 |
| 5,844,891 A | * | 12/1998 | Cox ........................... 370/235 |
| 5,875,402 A | * | 2/1999 | Yamawaki .................. 455/502 |
| 5,896,427 A | * | 4/1999 | Muntz et al. ............... 375/372 |
| 5,912,880 A | * | 6/1999 | Bernstein .................... 370/252 |
| 6,111,878 A | * | 8/2000 | Powell ................... 370/395.62 |
| 6,148,049 A | * | 11/2000 | Hein .......................... 375/354 |
| 6,151,356 A | * | 11/2000 | Spagnoletti et al. ........ 375/226 |
| 6,167,048 A | * | 12/2000 | Law et al. ............. 370/395.62 |
| 6,243,372 B1 | * | 6/2001 | Petch et al. ................. 370/350 |
| 6,285,722 B1 | * | 9/2001 | Banwell et al. ............. 375/354 |

FOREIGN PATENT DOCUMENTS

| | | |
|---|---|---|
| EP | 0 705 051 | 4/1996 |
| GB | 2307139 | 5/1997 |

OTHER PUBLICATIONS

"Synchronous Techniques for Timing Recovery in BISDN" Lau, et al. IEEE Transactions on Communications, vol. 43, No. 2/3/4. Feb./Mar./Apr. 1995.

Hassan M. Ahmed, "Adaptive Terminal Synchronization in Packet Data"; IEEE Global Telecommunications Conference & Exhibition, Communications Technology For The 1990's and Beyond, Dallas, Texas, Nov. 27–30, 1989, vol. 2, pp. 728–732, XP000091166.

Yoshihiko Akaiwa, "Introduction to Digital Mobile Communication"; John Wiley & Sons, Inc., New York, 1997, pp. 287–290.

* cited by examiner

*Primary Examiner*—Chi Pham
*Assistant Examiner*—Anh-Vu H Ly
(74) *Attorney, Agent, or Firm*—Squire, Sanders & Dempsey L.L.P.

(57) ABSTRACT

Clock generating method and apparatus for an asynchronous transmission, wherein a plurality of actual receiving signal arrival times are detected and averaged, to thereby avoid influences of randomly distributed delay variations upon signal transmission. Clock synchronization between a transmitting clock and a receiving clock is recovered by correcting the receiving clock on the basis of the obtained average of the actual arrival times and an expected arrival time. Thereby, overflow and underflow of a receiver buffer can be prevented.

11 Claims, 4 Drawing Sheets

CLOCK GENERATING METHOD AND APPARATUS FOR AN ASYNCHRONOUS TRANSMISSION

This application is a continuation of international application Ser. No. PCT/EP97/07264, filed 23, Dec. 1997.

FIELD OF THE INVENTION

The present invention relates to a method and apparatus for generating a clock for an asynchronous transmission, to be used especially in an ATM (Asynchronous Transfer Mode) connection between two devices of a Base Station Subsystem (BSS) in a GSM network.

BACKGROUND OF THE INVENTION

Usually, two elements of a Base Station Subsystem (BSS) in a GSM network are connected via a synchronous PCM connection. The principle of such an STM connection (Synchronous Transfer Mode) is shown in FIG. 1A. One of the devices, i.e. a transmitter 1, is selected as a master and its clock is used to synchronize PCM frames sent over the connection. The second device, i.e. a receiver 2, has a slave function, since its own clock is synchronized to the master clock of the transmitter.

In future ATM based GSM networks, a transcoder (TC) and a Base Transceiver Station (BTS) are connected via an asynchronous ATM connection, wherein synchronization is not available at the receiver 2. In an ATM connection, bit streams of binary signals of different channels are divided into unitary ATM cells to be transmitted in a time divisional manner. The cell rate defines the total number of ATM cells per second.

FIG. 1B shows the principle of such an ATM connection, wherein a transmitting clock generator 3 and a receiving clock generator 4 are not synchronized and operate independently.

However, without a synchronization, the frequencies of the transmitting clock and the receiving clock are not equal. Therefore, a buffer of the receiver 2 may be filled gradually and a buffer overflow may occur, if the transmitting clock of the transmitter 1 is faster than the receiving clock of the receiver, since the buffer reading speed is slower than the writing speed. On the other hand, if the transmitting clock is slower than the receiving clock, the receiver 2 may run out of data (buffer underflow).

Both cases can result in lost data and, in case of time sensitive applications like GSM speech, cumulative delay that can rapidly become irritating. Thus, buffer underflow as well as buffer overflow is audible.

It is therefore an object of the present invention to provide a clock generating method and apparatus for an asynchronous transmission, by means of which clock synchronization between a transmitter and a receiver can be maintained.

This object is achieved by a clock generating method for an asynchronous transmission, comprising the steps of:
  determining a plurality of actual signal arrival times;
  averaging said plurality of actual signal arrival times; and
  correcting a timing of a receiving clock on the basis of said average of the signal arrival times and an expected signal arrival time.

Furthermore, the above object is achieved by a clock generating apparatus for an asynchronous transmission, comprising:
  determining means for determining an average of actual signal arrival times and for generating a control signal on the basis of said average of the actual signal arrival times and an expected signal arrival time; and
  correcting means for correcting a timing of a receiving clock on the basis of said control signal.

Accordingly, since the timing of the receiving clock is corrected on the basis of an average of the actual arrival times of the signal and an expected arrival time, the receiving clock can be adjusted such that the expected arrival time coincides with the actual arrival time.

Moreover, by averaging the actual arrival time, delay variations upon signal transmission, which might cause synchronization errors, can be eliminated or at least significantly reduced.

Preferred developments of the present invention are defined in the subclaims.

BRIEF DESCRIPTION OF THE DRAWINGS

In the following, the invention and a preferred embodiment thereof will be described in greater detail with reference to the accompanying drawings in which.

DESCRIPTION OF THE PREFERRED EMBODIMENT

The following preferred embodiment relates to an ATM connection between two devices of a Base Station Subsystem (BSS) in a GSM network as described above.

In the GSM network, a full rate TRAU (Transcoder and Rate Adaption Unit) frame is packed inside one ATM cell. The TRAU frame is an information packet transferred between the TC and the BTS and may contain 20 ms of coded speech. Thus, the ATM cells are transmitted with an intervall of 20 ms corresponding to a cell rate r=50 cells/s. The clock frequencies $f_t$, $f_r$ of the transmitter 1 and the receiver 2 can be obtained from the cell rate r using $f_{t,r}=R \cdot r$, wherein R denotes the ratio between the clock frequency and the cell rate. For simplicity, it is assumed in the following that the clock frequencies $f_t$, $f_r$ of the transmitter 1 and the receiver 2 are equal to the cell rate (R=1).

Figure 1A:
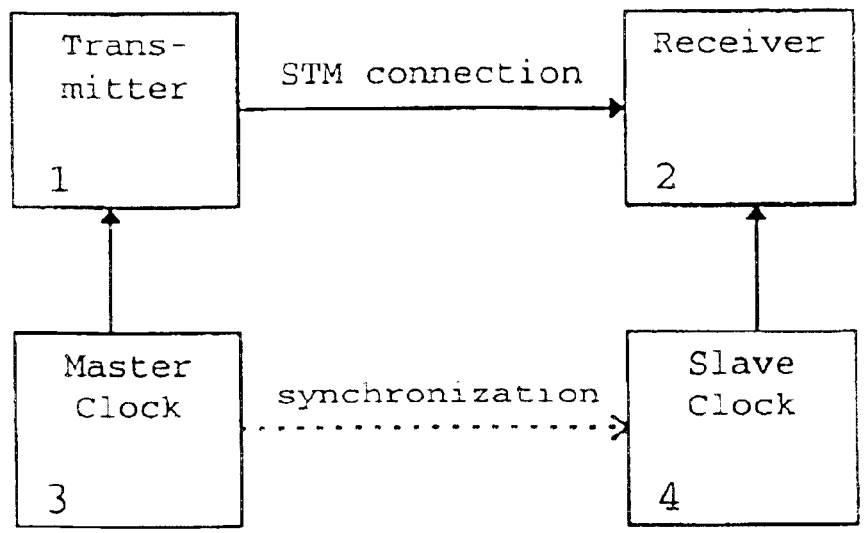
FIG. 1A shows an STM transmission principle according to the prior art.
Figure 1B:
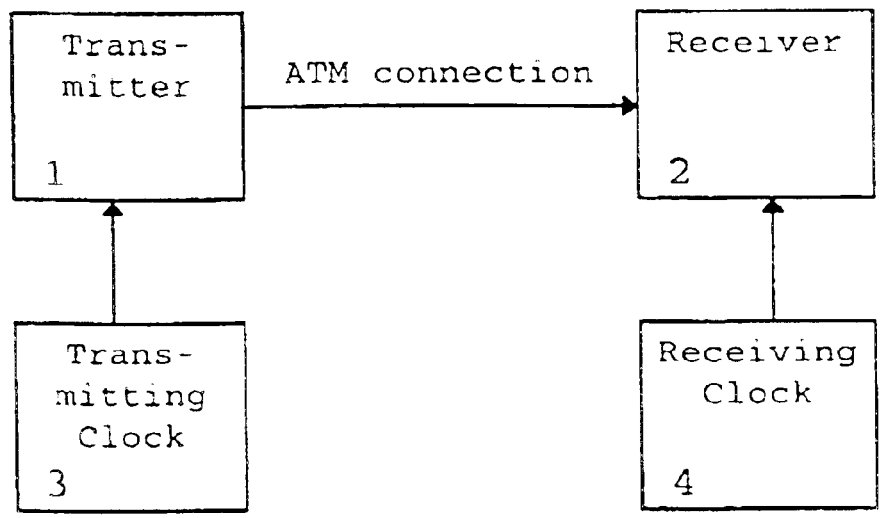
FIG. 1B shows an ATM transmission principle according to the prior art.
Figure 2:
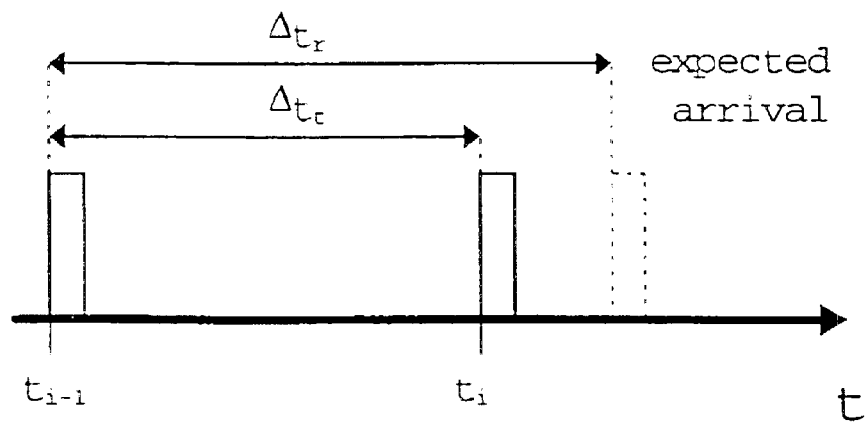
FIG. 2 shows a time chart for explaining an actual and an expected arrival time.

FIG. 2 shows an example for actual arrival times $t_{i-1}$ and $t_i$ of two adjacent cells i-1 and i at the receiver 2. According to the clock of the receiver 2, the cell i is expected to arrive after an interval $\Delta t_r$. However, due to a difference in the clock frequencies of the transmitter 1 and receiver 2, the cell i actually arrives after an interval $\Delta t_t$ shorter than the expected interval $\Delta t_r$. Thus, in the present case, the clock frequency $f_t$ of the transmitter 1 is higher than the clock frequency $f_r$ of the receiver 2.

Accordingly, from the viewpoint of the receiver 2, the transmitter 1 is transmitting at a cell rate higher than 50 cells/s.

On the other hand, the clock frequency $f_t$ of the transmitter 1 may be lower than the clock frequency $f_r$ of the receiver 2. In this case, the interval $\Delta t_t$ is longer than the expected interval $\Delta t_r$, and, from the viewpoint of the receiver 2, the transmitter 1 is transmitting at a cell rate lower than 50 cells/s.

In order to recover synchronization, the clock frequency $f_r$ of the receiver 2 has to be corrected so as to be equal to the clock frequency $f_t$ of the transmitter 1. Thus:

$$f_r^{corr} = f_t = \frac{1}{\Delta t_t} \tag{1}$$

The correction can be performed on the basis of the difference $\Delta f$ between the clock frequencies $f_t$ and $f_r$, which can be obtained as follows:

$$\Delta f = f_t - f_r = \frac{1}{\Delta t_t} - \frac{1}{\Delta t_r} = \frac{\Delta t_r - \Delta t_t}{\Delta t_t \Delta t_r} = \frac{C - \Delta t_t}{\Delta t_t C} \tag{2}$$

wherein the constant C represents the time interval $\Delta t_r$ which is fixed from the viewpoint of the receiver 2, assuming that the frequency $f_r$ of the receiving clock does not vary. It is to be noted that $\Delta f$ may also be a negative, if $f_t < f_r$.

As already mentioned, according to the GSM specifications, the cell rate is 20 ms during normal speech transmission. Thus, the constant C is set to 20 ms. In case of Discontinuous Transmission (DTX), only TRAU frames containing a comfort noise information are sent every 480 ms, which means that, in this case, C has to be set to 480 ms.

In order to perform correction, the above frequency difference $\Delta f$ has to be added to the frequency $f_r$ of the receiving clock of the receiver 2, so that the receiver 2 operates substantially at the same frequency as the transmitter 1. Thus, the corrected clock frequency $f_r^{corr}$ of the receiver 2 can be obtained as follows:

$$f_r^{corr} = f_r + \frac{C - \Delta t_t}{\Delta t_t C} \tag{3}$$

Here, it is assumed that the difference between the time intervals $\Delta t_r$ and $\Delta t_t$ only results from a clock difference between the transmitter 1 and the receiver 2.

However, the above time difference between the actual and expected arrival times is not only caused by the difference between the clock frequencies $f_r$ and $f_t$ but also by a signal delay due to the signal propagation via the ATM network. Namely, an ATM cell carrying a TRAU frame has a so-called time-dependent Cell Delay Variation (CDV) caused by the ATM network.

Thus, the time interval $\Delta t_t$ actually results from the sum of the instantaneous CDV and the clock period of the transmitter, and can be obtained as follows:

$$\Delta t_t = \Delta t_{CDV}^i + \frac{1}{f_t} \tag{4}$$

wherein the index i denotes an ith cell.

However, if the actual arrival time is largely affected by the CDV, the receiving clock is mainly adjusted to the more or less random CDV and not to the transmitting clock. Nevertheless, in view of the fact that the CDV is randomly distributed with a mean value of zero, the CDV can be eliminated by obtaining an average $\Delta t_t^{ave}$ over a certain number N of samples.

By replacing $\Delta t_t$ by $\Delta t_t^{ave}$ in equation (3), a good estimation of the actually required corrected frequency of the receiving clock can be obtained as follows:

$$f_r^{corr} = f_r + \frac{C - \Delta t_t^{ave}}{\Delta t_t^{ave} C} \tag{5}$$

The average value $\Delta t_t^{ave}$ is calculated as follows:

$$\Delta t_t^{ave} = \frac{1}{N} \sum_{i=1}^{N} \Delta t_{CDV}^i + \frac{1}{N} \sum_{i=1}^{N} \frac{1}{f_t}, \tag{6}$$

wherein N should be selected such that the first sum of equation (6) can be neglected.

The practical value of N depends on the magnitude of the CDV and the desired accuracy and may be in a range between 100 and $10^5$. In the present speech channel, N=100 corresponds to 2 seconds of speech. Thus, a practical value could be N=$10^4$ corresponding to 3 min of speech, which can be achieved during a telephone call. If the present invention is applied to transmission with higher bit rates, N can be chosen even larger.

During the Discontinuous Transmission (DTX), where C=480 ms, N could be incremented by one every 20 ms or by 24 every 480 ms during the calculation of the above sums.

However, if N is too small, the resulting difference between the actual and the expected arrival time of the cells may even increase due to the random distribution of the CDV.

Figure 3:
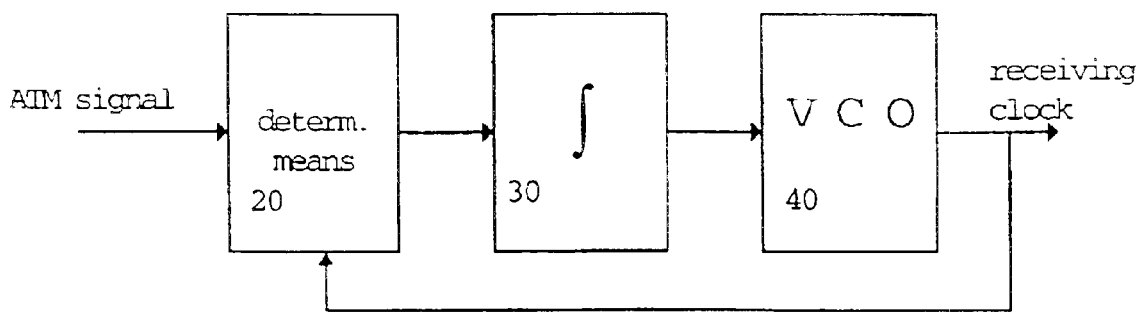
FIG. 3 shows a block diagram of a clock generating apparatus according to the preferred embodiment of the present invention.

FIG. 3 shows a block diagram of the preferred embodiment. The receiving clock of the receiver 2 is corrected by means of a voltage controlled oscillator (VCO) 40 or any other controllable signal generator. A control signal supplied to the VCO 40 is derived from the output of a determining means 20 to which the actual receiving clock and the receiving signal, i.e. ATM cells, are supplied and which generates an output signal according to the above equation (5).

The output signal of the determining means 20 can be supplied to the VCO 40 via an integrator 30 so as to improve accuracy and stability of correction.

Figure 4:
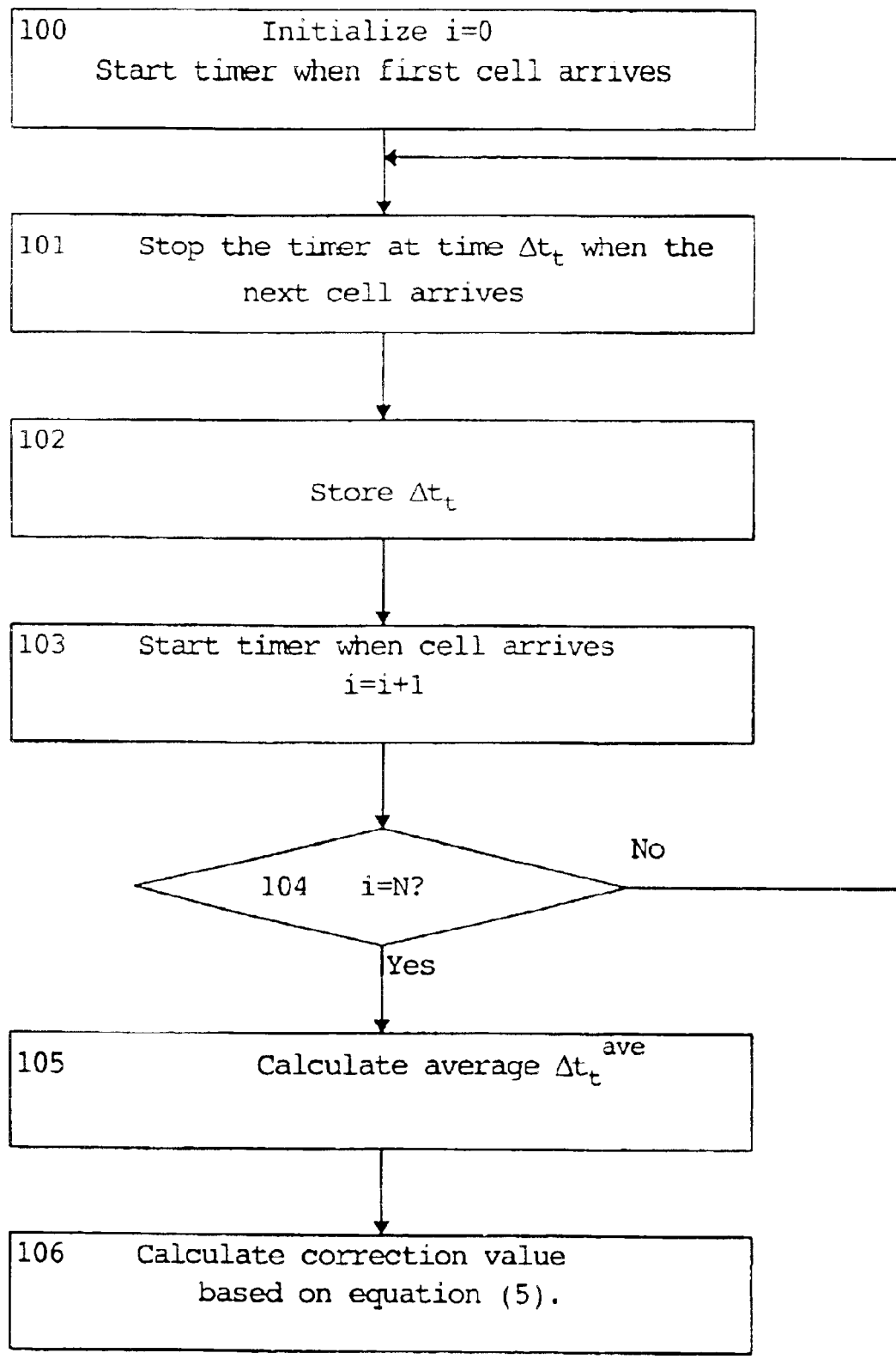
FIG. 4 shows a flow diagram of a clock generating method according to the preferred embodiment of the present invention.

FIG. 4 illustrates a flow chart of the signal processing steps performed in the determining means 20.

At first, in step 100, a counting variable i is set to 0 and a timer implemented by hardware or software is started when the first ATM cell is received. Subsequently, the timer is stopped when the next ATM cell is received to thereby obtain the value of $\Delta t_t$ as a result of counting (step 101). The obtained value of $\Delta t_t$ is stored (step 102) and the timer is reset and started again when a new cell is received, wherein the value i is incremented (step 103).

In step 104, it is determined whether i has reached the value N, i.e. whether N sample have been stored. If so, the average value $\Delta t_t^{ave}$ is calculated in step 105 by adding the stored values of $\Delta t_t$ and deviding the sum by N. In case i is smaller than N, the flow returns to step 101 in order to repeat steps 101 to 104 until i equals N.

After the average value $\Delta t_t^{ave}$ has been calculated, the correction value for the frequency $f_r$ of the receiving clock is calculated in accordance with equation (5). The obtained correction value is used to control the VCO 40 or any other clock generation means.

Figure 5:
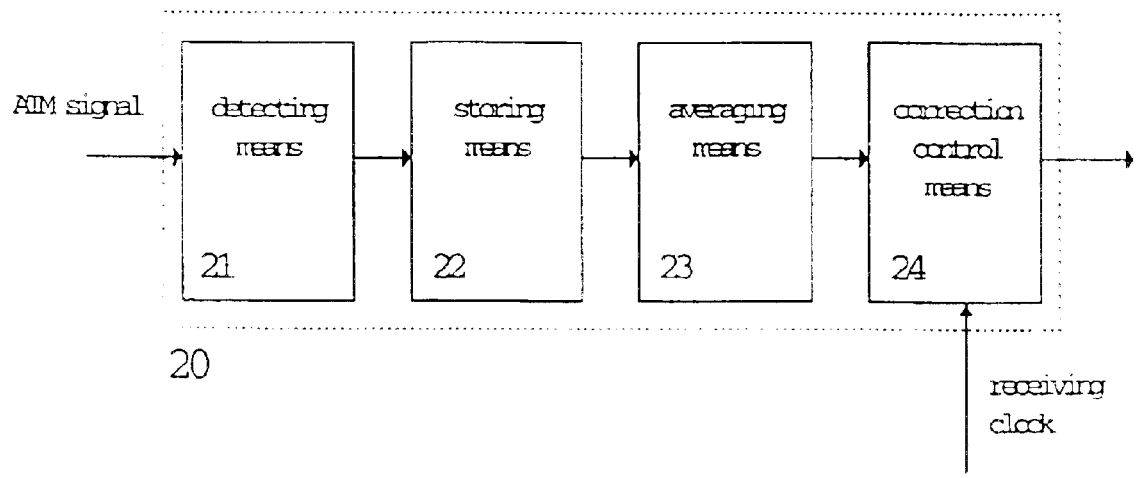
FIG. 5 shows a block diagram of a determining means of the clock generating apparatus according to the preferred embodiment of the present invention.

The determining means 20 may be constituted as shown in FIG. 5. A detecting means 21 is provided for detecting the actual arrival time of ATM cells. In accordance with the above described steps, the detecting means may comprise a timer. The obtained values of $\Delta t_t$ are stored in a storing means 22 in order to be used by an averaging means 23 in order to obtain an average over N sample values. The obtained average of the actual arrival times is supplied to a correction control means 24 together with the receiving clock. The correction control means 24 generates a control signal in accordance with the above equation (5). Thus, it essentially works as a time difference calculator.

The above described detecting means 20 according to FIG. 5 may be implemented by discrete hardware components or by a CPU which is controlled on the basis of a control program.

In case of a hardware implementation, the correction control means 24 may comprise a phase detector which may operate as follows.

If the time difference is positive, i.e. the actual arrival time is shorter than the expected arrival time ($\Delta t_t < \Delta t_r$), a pulse of a first polarity (e.g. positive pulse) is generated as the control signal, and if the result is negative, i.e. $\Delta t_t > \Delta t_r$, a pulse of a second polarity (e.g. negative polarity) is generated. These pulses are used to control the VCO 40. Thus, only a comparison between the time intervals $\Delta t_t$ and $\Delta t_r$ is actually required in order to correct the clock frequency of the receiver 2.

In summary, a clock generating method and apparatus for an asynchronous transmission are disclosed, wherein a plurality of actual receiving signal arrival times are detected and averaged, to thereby avoid influences of randomly distributed delay variations upon signal transmission. Clock synchronization between a transmitting clock and a receiving clock is obtained by correcting the receiving clock on the basis of the obtained average of the actual arrival times and an expected arrival time. Thereby, overflow and underflow of a receiver buffer can be prevented.

It should be understood that the above description and accompanying figures are only intended to illustrate the present invention. Thus, the method and apparatus according to the invention may also be used in systems other than the described GSM system. The preferred embodiment of the invention may thus vary within the scope of the attached claims.

What is claimed is:

1. A clock generating method for an asynchronous transmission, comprising:

determining a plurality of actual signal arrival times for a number of samples;

averaging the plurality of actual signal arrival times over the number of samples;

correcting a timing of a receiving clock on a basis of an average of the plurality of actual signal arrival times and an expected signal arrival time;

deriving an expected signal arrival time from the receiving clock; and determining a frequency difference between a frequency corresponding to an average of the plurality of actual signal arrival times and a frequency of said receiving clock, and changing the frequency of the receiving clock according to said frequency difference;

wherein the number of samples is set such that a time-dependent cell delay variation of actual signals being asynchronously transmitted has a mean value of zero.

2. The method according to claim 1, wherein determining further comprises counting a time period between arrival of a first signal and arrival of a subsequent second signal.

3. The method according to claim 2, wherein averaging further comprises storing counted time periods and calculating an average of stored time periods.

4. The method according to claim 1, wherein the asynchronous transmission is an ATM transmission and the signal is an ATM cell.

5. A clock generating apparatus for asynchronous transmission comprising:

means for determining an average of actual signal arrival times over a number of samples and for generating a control signal on a basis of a determined average of the actual signal arrival times and an expected signal arrival time; and means for correcting a timing of a receiving clock on a basis of the control signal;

wherein the number of samples is set such that a time-dependent cell delay variation of actual signals being asynchronously transmitted has a mean value of zero.

6. The apparatus according to claim 5, wherein the means for correcting comprises a voltage controlled oscillator.

7. The apparatus according to claim 5, wherein the means for determining comprises:

means for detecting an actual arrival time of a signal;

means for averaging a plurality of detected actual signal arrival times over the number of samples in order to obtain an average of the actual signal arrival times; and means for comparing and correction control the average of the actual signal arrival times with the expected signal arrival time and for generating the control signal in accordance with a comparison result, wherein the expected signal arrival time is derived from the receiving clock.

8. The apparatus according to claim 7, wherein the means for determining comprises means for storing a plurality of detected actual signal arrival times.

9. The apparatus according to claim 7, wherein the means for detecting comprises a timer.

10. The apparatus according to claim 7, wherein means for comparing and correction control comprises a phase detector, and wherein a polarity of the control signal is changed in accordance with a result of comparison.

11. The apparatus according to claim 5, wherein the asynchronous transmission is an ATM transmission and the signal is an ATM cell.

* * * * *